Figure 1:
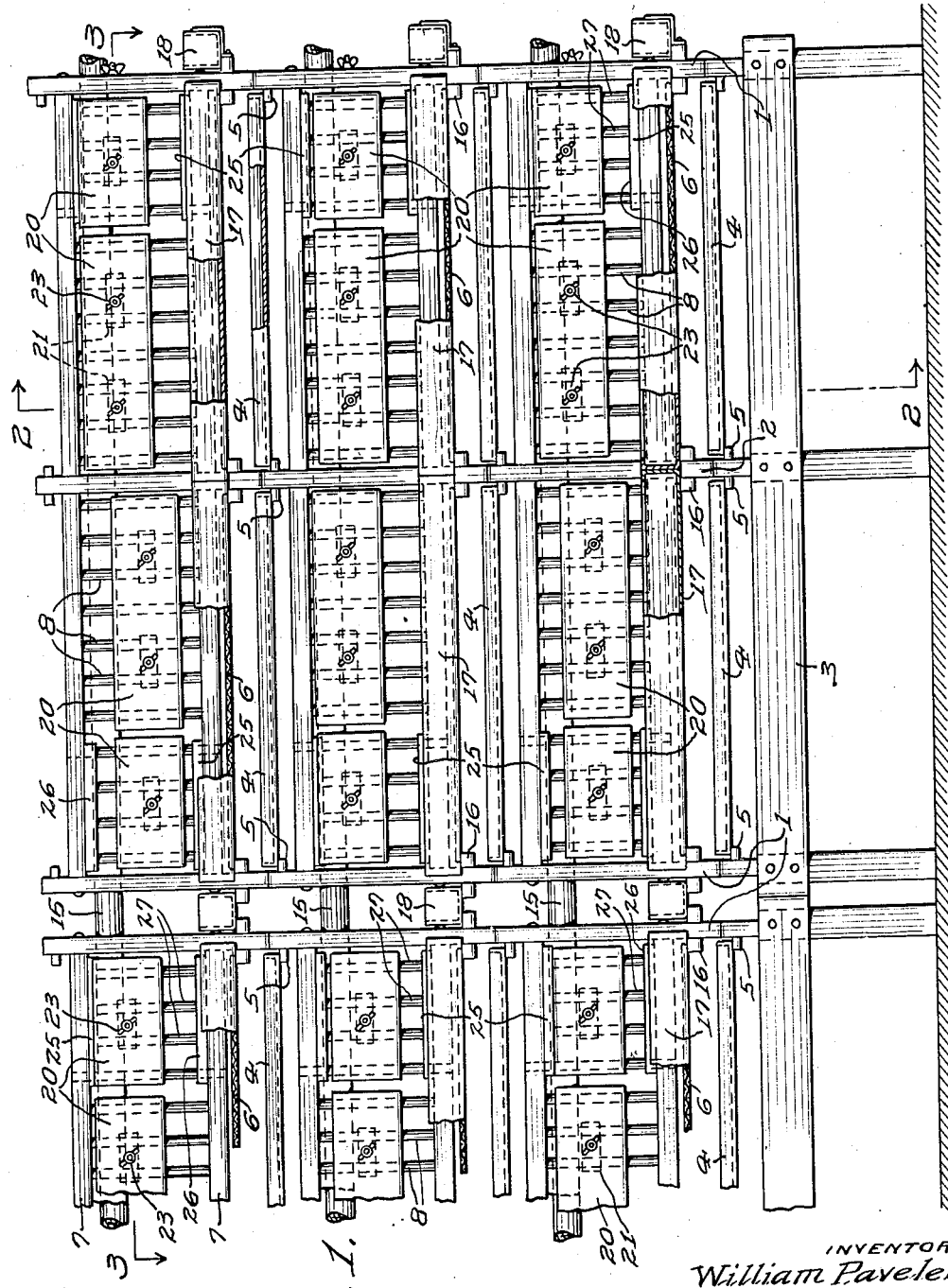

April 19, 1932.  W. PAVELEC ET AL  1,854,311
BROODER
Filed Aug. 16, 1929  3 Sheets-Sheet 1

INVENTORS
William Pavelec,
John A. Baker.
BY
ATTORNEYS

WITNESS

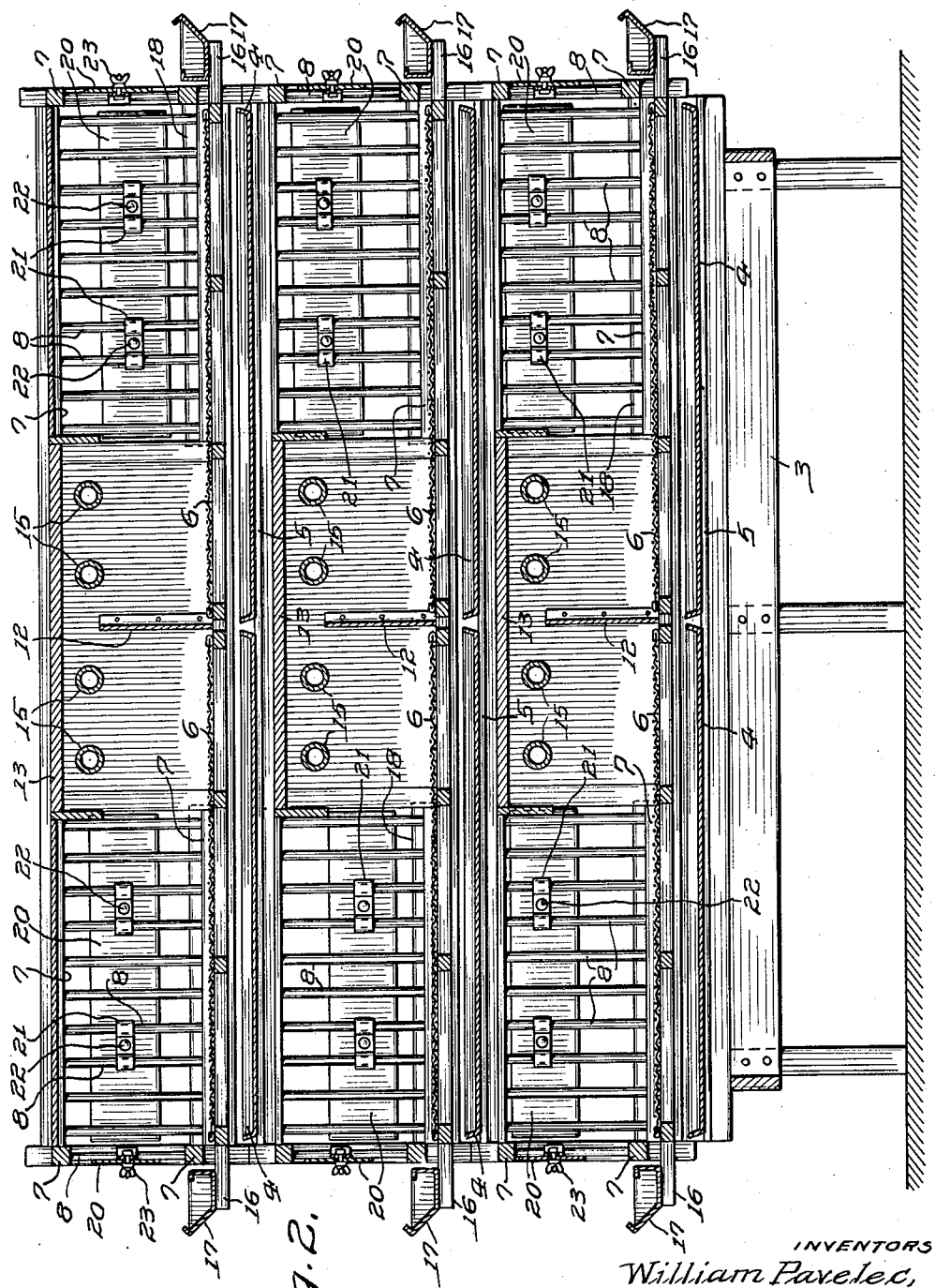

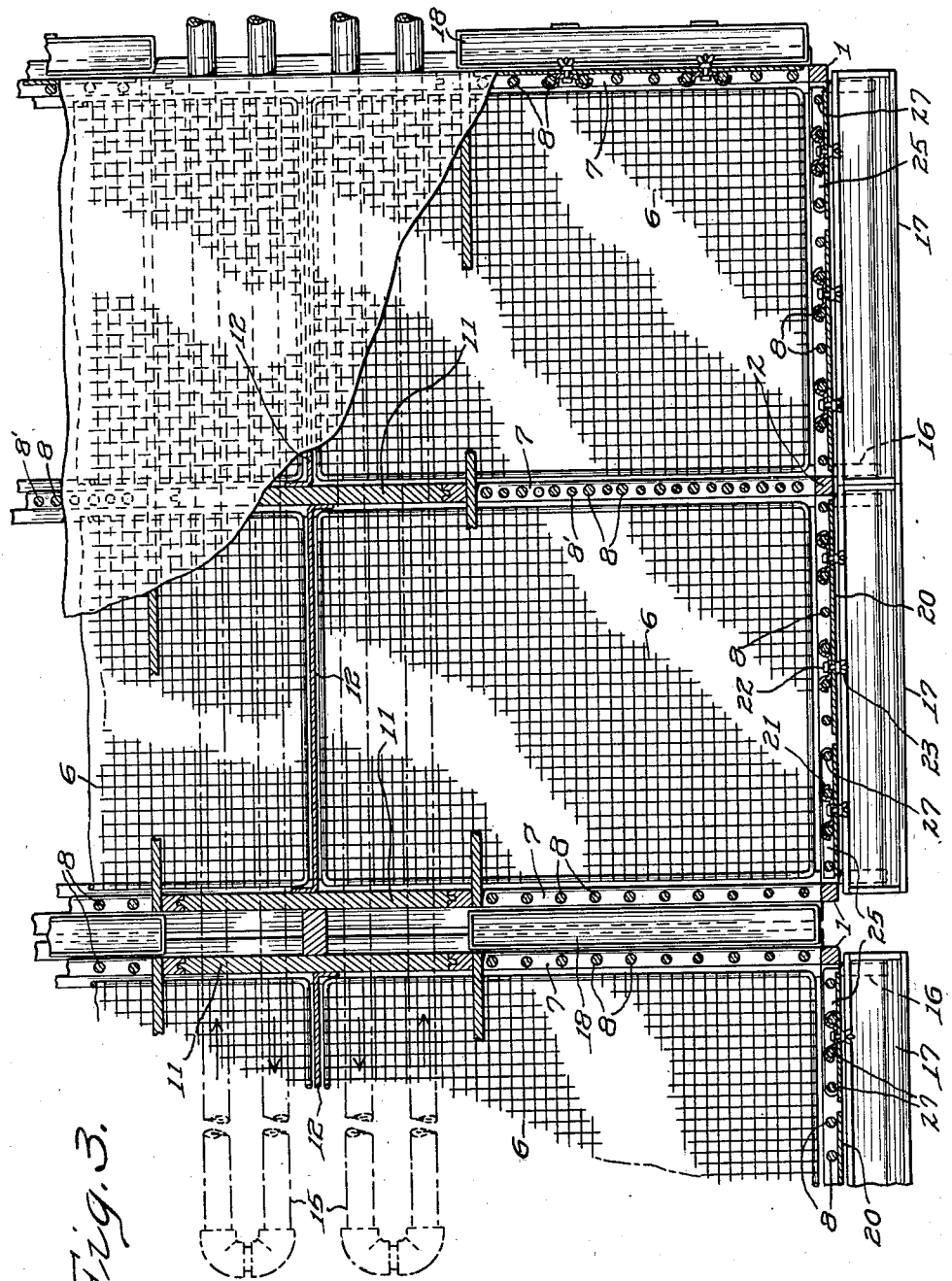

Patented Apr. 19, 1932

1,854,311

UNITED STATES PATENT OFFICE

WILLIAM PAVELEC, OF NEW BRUNSWICK, NEW JERSEY, AND JOHN A. BAKER, OF ELYRIA, OHIO, ASSIGNORS TO AMERICAN INCUBATORS, INC., OF NEW BRUNSWICK, NEW JERSEY, A CORPORATION OF NEW JERSEY

BROODER

Application filed August 16, 1929. Serial No. 386,246.

Our invention relates to brooders and more particularly to that class of brooders adapted to accommodate large numbers of chicks and young fowl of varying degrees of maturity in a battery comprising a plurality of compartments, which may be arranged in tiers, and provided with a common heating source adapted to selectively maintain constant and desired temperatures in the several tiers of compartments, whereby birds of various ages may be housed in respective tiers and the temperature best adapted to the conditions in each tier may be there maintained.

The brooding of chicks, and especially those newly hatched, by artificial means has always been a problem of some difficulty, more especially, of course, in winter when weather conditions are subject to wide and rapid changes which require for successful brooding in large quantities that a brooder not readily affected by such changes be provided. It is also important that free circulation of air about and through the living quarters of the chicks be maintained, without, however, permitting draughts to which young chicks especially are extremely sensitive, the mortality rate of chicks raised in draughty brooders being considerably higher than is found to be the case when draughts and relatively rapid air currents are reduced to a minimum, other factors affecting the mortality rate being equal.

This difficulty has been partially solved in the past by the use of long type brooder houses with central heating systems. Such houses, when equipped with a sufficient amount of heat-radiating surface to permit adequate heating without excessively rapid air circulation enable the operator to maintain almost any temperature desired at all times, and being of air-tight construction, the chicks housed therein may be thus protected from undesirable and sometimes fatal draughts. Buildings of this type, however, are expensive to construct, and are not an economical investment unless several thousand chicks are to be kept.

An additional advantage of a brooder constructed in accordance with my invention is that cannabalism is eliminated without in any way resulting in any loss of chicks from starvation or other causes resulting from failure of chicks to gain access to sufficient feed and drinking water. It will be understood by those familiar with brooding problems that when chicks and young fowl are kept together in large numbers a very substantial loss often results from birds, especially those on which even a small spot of blood appears as a result of some inadvertent wound due to picking or other cause, being attacked by other birds in the compartment, resulting in a very short time, in the death of those so attacked. We have found that losses from this cause may be wholly or substantially avoided by the darkening to a greater or less degree of the space wherein the birds are kept. Our invention is directed, therefore, among other things, to providing means for shutting off, in part, the entry of light into the interiors of the compartments in which the chickens are housed whereby portions thereof are rendered dark or semi-dark, the said means, however, affording sufficient light upon the feed and water troughs to guide the chickens thereto. The said means are also constructed so as to be adjustable to provide openings through which the chickens extend their heads in feeding and drinking of varying sizes suitable for chickens of different ages and growths, the openings being graduated so as to prevent the escape of the smaller chicks therethrough. By our light control arrangement, cannibalism is avoided inasmuch as observance of blood spots upon the chickens is prevented owing to the darkening of the compartment interiors.

It has also been our desire to provide a brooder which is capable of use for fowl of any stage of development, without requiring structural or other alterations in order to accommodate fowl of different sizes, and in the brooder, constructed in accordance with our invention, accommodations for newly hatched and for fully grown fowl may be provided with equal facility and at the same time.

Other purposes, objects and advantages of our invention will appear from the following more particular description of one embodiment of a structure comprising our invention, reference being had to the accompanying drawings thereof illustrating our invention as applied to a brooder of the battery type comprising a plurality of sections, each section comprising three or four superimposed tiers of four brooder compartments each, the structures shown being portions of a battery brooder adapted for installation in association with a hot water heater, not shown, it being considered that for this type of brooder hot water heating is most advantageous, but it will be understood that other means for heating the brooder of our invention may be substituted therefor. Although the battery brooder shown in the drawings comprises compartments on both sides, the rear portions abutting, it will be understood that our invention may be utilized in a single faced battery or in a single compartment.

Referring more particularly to the drawings, Fig. 1 is a fragmentary front elevation of a battery brooder constructed in accordance with our invention showing portions broken away and indicating the manner in which a battery may be arranged by interconnection of adjacent brooder sections. Fig. 2 is a vertical section along the lines 2—2 in the direction indicated by arrows in Fig. 1 and Fig. 3 is a fragmentary view in horizontal section along the line 3—3 and in the direction indicated by arrows in Fig. 1.

Referring now more particularly to Fig. 1, a single complete unit or section of a brooder embodying our invention will be described somewhat in detail herein, it being understood that a plurality of like or similar units or sections may be employed if desired, and provision is made for heating arrangements adapted to accommodate several adjacent sections to temperature regulation and control from a single source. Thus the brooder section shown in Fig. 1 comprises a main frame, which may be constructed of wood or any other suitable material, of which the corner posts 1 and the center posts 2 provide the main vertical support for the lesser parts, and are preferably supported somewhat above the floor as by the leg frame 3, which provides also support for the lowermost tier of droppings pans 4, one of which is disposed subjacent each compartment throughout the brooder and supported by any suitable means, as at its side edges by cleats generally designated at 5. The pans are preferably made from galvanized sheet metal and are readily removable, to permit cleaning and the like, and we provide, therefore, sufficient clearance between them and the superjacent floor 6 of the respective brooder compartments to permit such removal when desired. The flooring 6 of the compartments is preferably of wire mesh, of about one-half inch square interstices, which provides sufficient support for the chicks in the brooder while permitting dirt and refuse to fall through to the pan 4 below, thus keeping the interiors of the compartments themselves clean and sanitary at all times.

The walls of the compartments comprise the upper and lower transverse joists 7, between which are inserted vertical bars 8 spaced at intervals sufficiently close to prevent the escape of the chicks, except, perhaps, the very young, and wide enough to permit feeding and drinking therethrough. When two compartments are to be separated by a single barrier it is preferable to space the vertical bars 8' at somewhat smaller intervals, to prevent disputes which might otherwise arise between birds in adjoining compartments, as a result of partial access from each to the other. This narrow spacing is also desirable to prevent the intermingling of very young chicks, for, as will afterward appear, it is not necessary that the bars in the outer walls of the brooder section be so close together as to provide insufficient space between them for the passage of a very young chick therethrough.

Near one end of each compartment, preferably at the inner ends of the compartments in the double compartment section described herein, it may be preferable to provide solid wall portions 11 which may be of board, and a metal or plywood partition 12 may be provided between adjacent compartments, which is not required to be the full height of the compartment, since by providing a small open space above this partition, desirable air circulation may be had, while the partition is effective to separate the occupants of the respective compartments. Above these solid wall portions a board or other partition 13 may provide a tight cover, thus completing a relatively sheltered and protected hover in each compartment, in which, in the upper part of each, may be disposed substantially horizontally the hot water pipes 15 or other heating means for the brooder. Thus I have shown pipes 15 adapted for hot water and arranged so that a complete circuit of hot water through each tier of the brooder may be made, circulation being maintained in the ordinary way and controlled by a valve in the circuit. It will be observed that by installing the heating means in the rear of the compartments, varying zones of heat are provided therein, the lower temperatures being adjacent the outer sides and the higher temperatures adjacent to and within the hovers, thereby enabling a chick to avail itself of the temperature which is most congenial.

Adjacent the barred outer sides of each compartment, on cleats 16 supported in any suitable manner, may be supported feed troughs 17 and water troughs 18, so positioned that their contents may be reached by the chicks or fowl extending their heads through the spaces between the bars 8.

Attached to the bars 8 I provide the shields or guards 20 which may be adjustably held against the bars 8 by engagement of the clamp 21, the bolt 22 and the thumb screw 23. Thus it will be understood that the shields 20 are vertically adjustable and may be positioned relatively near the base, permitting openings of just sufficient width beneath them for the heads of small chicks to protrude therethrough, or may be positioned near the top to permit access of larger fowl to the feed and water in the troughs outside the bars. The shields 20 are preferably so constructed that they will partially prevent passage of air currents through the brooder and will cut off a considerable portion of the light outside the brooder, and thus maintain relatively darkened conditions within, whereby cannibalism is prevented and as some light is admitted through the spaces through which the birds may feed and drink, the birds are attracted thereto by the light and the danger of loss through darkness causing failure of chicks to find feed and water is eliminated. It will be understood that the shield 20 may be made of sheet metal, plywood, or any suitable material, but that its particular form or relative dimensions are not limited with any exactness, as varying circumstances may require variations in these factors.

It will be observed that the doors 25 in the front of the brooder provide means for access to the interior of the compartments through which the birds may be introduced into or removed from the brooder. The doors 25 each comprise a pair of horizontal strips 26 fitted with the vertical bars 27 and hingedly supported between the joists 7 and provided with a suitable latch or other fastening means to prevent escape of the chicks but to permit the door to be readily opened by the operator.

It will now be evident that we have invented and hereinbefore described a brooder which provides desired conditions of temperature, air circulation, segregation and sanitation while providing also protection against dangers of cannibalism, of undernourishment and of other irregularities and undesirable features of brooders heretofore constructed resulting in either loss or imperfect development, and we have also greatly reduced the labor and inconvenience required to give proper care and attention to the brood.

Having thus described one embodiment of our invention, it will be understood that we do not thereby desire or intend to confine ourselves thereto, as many variations and departures may be made from the precise form described embodying the principles of our invention, and that we do not limit our invention to brooders adapted to the care of fowl but that others adapted to the care of other birds, of reptiles and of animals may be devised without departing from the spirit and scope of our appended claims.

Having thus described our invention, we claim and desire to protect by Letters Patent of the United States:

1. A brooder of the class described, comprising a plurality of compartments, the exposed walls of which being each composed of a plurality of spaced vertical bars and an opaque light and air excluding shield adjustably mounted on the bars of each compartment and movable upwardly and downwardly to provide a lower opening to afford access to exterior receptacles, said shields being independently adjustable to provide lower openings of different sizes without materially affecting the ventilation or the amount of light excluded by the said shields.

2. A brooder compartment having a wall for the sides and front thereof, said wall comprising a plurality of spaced vertical bars, a galvanized sheet metal shield arranged on the bars and being of an area to exclude a predetermined amount of light and air from the compartment, and a clamp carried by said shield and adjustably engaging a plurality of said bars to support the shield in varying positions to provide a lower opening of the required size to afford access to exterior receptacles, the amount of light and air excluded being unaffected by the vertical adjustment of the shield.

In witness whereof we have affixed our signatures.

WILLIAM PAVELEC.
JOHN A. BAKER.